May 11, 1954

G. W. T. BIRD ET AL 2,677,918

APPARATUS FOR BENDING AND TEMPERING SHEETS OF GLASS

Filed April 29, 1949

INVENTORS
GEORGE WILLIAM TERENCE BIRD
JOHN DENNETT &
EDWARD MATHEW SANDFORD WOOD

By

ATTORNEY

May 11, 1954 G. W. T. BIRD ET AL 2,677,918
APPARATUS FOR BENDING AND TEMPERING SHEETS OF GLASS
Filed April 29, 1949 6 Sheets-Sheet 5

INVENTORS
GEORGE WILLIAM TERENCE BIRD
JOHN DENNETT &
EDWARD MATHEW SANDFORD WOOD
By
ATTORNEY

May 11, 1954 G. W. T. BIRD ET AL 2,677,918
APPARATUS FOR BENDING AND TEMPERING SHEETS OF GLASS
Filed April 29, 1949 6 Sheets-Sheet 6
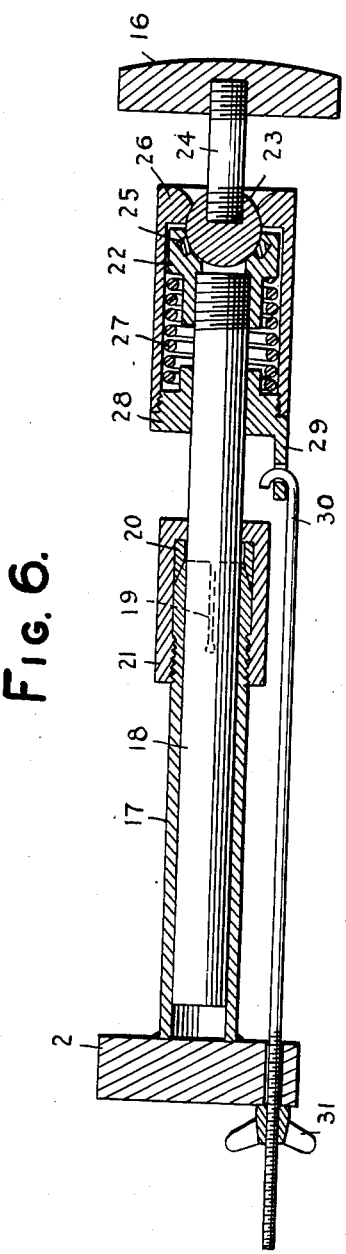
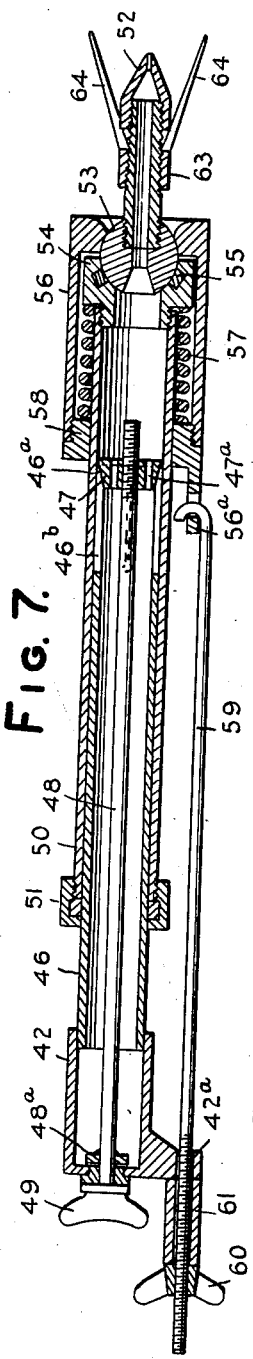
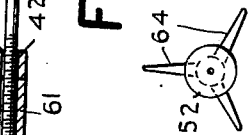
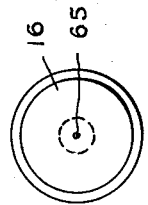
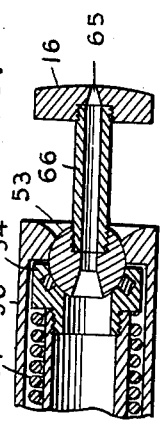
INVENTORS
GEORGE WILLIAM TERENCE BIRD
JOHN DENNETT &
EDWARD MATHEW SANDFORD WOOD
By
ATTORNEY Patented May 11, 1954

2,677,918

UNITED STATES PATENT OFFICE 2,677,918

APPARATUS FOR BENDING AND TEMPERING SHEETS OF GLASS

George William Terence Bird, St. Helens, John Dennett, Windle, St. Helens, and Edward M. S. Wood, Ecclestone Park, Prescot, England, assignors to Societe Anonyme des Manufactures des Glaces & Produits Chimiques de Saint-Gobain, Chauny & Cirey, Paris, France Application April 29, 1949, Serial No. 90,386

12 Claims. (Cl. 49—1)

This invention relates to the art of manufacturing bent sheets of glass.

In the usual practice of bending flat sheets of glass, it is usual to heat a sheet in a furnace up to near its softening temperature, withdraw the sheet from the furnace and suspend it by tongs at a bending station midway between mutually movable shaping bars thereat, the shaping bars having a linear form corresponding to the configuration desired for the sheet and the bars being normally spaced apart to freely allow entry between them of the hot suspended sheet.

After the hot sheet has been disposed between the bars, the latter are advanced towards each other and clamp the sheet between them thereby imparting the desired configuration to the sheet. After thus bending the sheet, the bars are withdrawn and the bent sheet is then freed to be cooled, or quenched so as to be tempered as required.

It has been proposed, with a view to avoiding the interchanging of bars to obtain different curvatures, to constitute the shaping means as laminated blocks. These laminations or fillets are clamped together for a bending operation and the clamping is released when it is desired to relatively set the laminations or fillets to vary the curvature. Such construction is devised to provide a means of varying the form of simple bends produced in one apparatus.

The main object of the present invention is to provide an improved form of an adjustable apparatus, whereby smooth, simple bends of various forms can be obtained and, moreover, from the same apparatus compound bends can be produced. This apparatus saves the cost of separate shaping members particularly where only a few glass sheets of any particular bend are required.

Another object of the present invention is a bent glass sheet produced by the employment of apparatus constructed according to the present invention.

An object of the present invention is to provide an apparatus for bending a sheet of glass which has been heated up to near its softening temperature, comprising two similar carriers arranged in spaced relation, the opposed faces of each carrier supporting a similar series of individually mounted shaping pads, each pad being mounted so as to be disposable in desired spaced relation with its respective carrier to effect a predetermined bend on hot glass disposed between the carriers, and supporting means for the carriers on which they are mutually adjustable towards and away from each other to effect the bending operation. The carriers may be flat plates or flat frames.

The shaping pads may be made of wood or faced with wood, plaster or asbestos and the pads may be mounted so as to be arranged in rows or in concentric circles or other closed paths as may be desired.

The carriers may be provided with a plurality of telescopic members which are adjustable axially to or from the carriers, and each member carries a shaping pad, whereby on suitable adjustment of the pads either simple or compound bends can be produced.

Preferably, all the pads are individually hingedly or universally mounted so that they adapt themselves to a desired curvature, and fixing means are provided for securing each pad in set position.

After having been bent, the sheet may be subjected either to an annealing or to a tempering operation.

A further object of the invention is to devise means for suitably tempering glass sheets which have been shaped to a predetermined bend, whether the bent glass comprises simple or compound bends, whereby the desired degree of equality of tempering may be effected over the whole of both surfaces of the glass.

The tempering apparatus according to the present invention comprises opposed banks of nozzles adapted to simultaneously direct quenching jets against both faces of the glass sheet disposed between them which has previously been bent and is at a temperature suitable for its quenching wherein each nozzle is carried by a tube individual to the nozzle, which tube is so mounted on a conduit for the quenching fluid that the length of the path of the respective jet from the nozzle to the locality of the glass on which the jet impinges may be adjusted.

By employing said tempering apparatus unequal heat extraction over both faces of flat glass at any locality may be minimised, and deformation of shaped glass from the intended bend, engendered by such unequal heat extraction, eliminated.

According to an embodiment of said apparatus, each nozzle-carrying tube is an integer of a telescopic tube mounted on the conduit, and the telescopic tube thus constituted has means for clamping the integers thereof in each position of relative axial adjustment.

The nozzle is preferably hingedly or universal-clamping the nozzle in alignment with, or in any selected position of tilt with respect to, the axis of the tube, whereby also the direction of the path of each individual jet may be varied.

Each conduit, on which a bank of nozzles is mounted, is constituted either as an air box or as a plurality of pipes on which the nozzles are grouped. The pipes may be individually connected to the source of quenching fluid, or connected thereto through a duct or ducts on which the pipes are mounted or to which they are joined by flexible tubing. The pipes may be arranged in concentric circles or other closed curved lines. Preferably, however, they are parallelly arranged and are mounted on or flexibly connected to a header or headers.

A further object of the present invention is to provide a combined apparatus for producing tempered bent glass sheets, which is readily adaptable for obtaining tempered sheets of different curved forms.

The apparatus according to the present invention for bending and tempering a sheet of glass which has been heated up to near its softening temperature comprises two carriers, each provided with tempering and shaping means substantially as above described, said carriers being mounted for movement towards one another to effect bending by the shaping means and to be withdrawn from the glass after a bending operation to dispose the tempering means so that the quenching jets projected from the tempering means are given the desired distance of travel to the glass and tempering effected immediately after the bending operation, the glass remaining in the position which it occupied during bending.

The shaping means are preferably apertured and disposed around jet forming tempering means so that quenching jets pass through the shaping means to the glass and are associated with blowing nozzles mounted on the carrier. The opposed faces of each carrier preferably support a similar series of individually mounted shaping pads and blowing nozzles being mounted so as to be disposable in desired spaced relation with its respective carrier to effect a predetermined bend on hot glass disposed between the two carriers and so that simple or compound bends can be produced in one form of apparatus, and immediately after the bending operation is completed the glass can be quenched.

Apparatus for bending and tempering a sheet of glass according to the present invention preferably comprises means for varying the length and direction of the path of each individual quenching jet to the locality of the glass whereby the desired degree of equality of heat exchange is obtainable over the whole of both surfaces of the glass.

The apparatus according to the invention for bending and tempering a sheet of glass may comprise two sets of shaping elements each constituted by pads mounted on telescopic tubes and apertured to constitute jet forming means, the tubes in one set being co-axial with the tubes in the opposed set, each telescopic tube being connected to a common supply pipe and the supply pipes being mounted on a header mounted on a chassis provided with means to advance or retract the chassis, and thereby move the respective pads in an axial direction.

Preferably, each of the jet forming means is hingedly or universally mounted so that each jet may have a predetermined direction with respect to the local area of the glass opposed to it and may be directed so that all the jets are directed with their axes normal to the locality on which the respective jets impinge. Where the shaping elements are not arranged co-axially with the jet forming means they also may be hingedly or universally mounted to adapt themselves to a desired curvature and fixing means are provided for securing the shaping elements in set position.

In order that the invention may be more clearly understood different forms of embodiment will now be described, by way of example, with reference to the accompanying drawings, in which:

Fig. 6 is a longitudinal sectional view of one of the shaping pads with their telescopic members shown in Figs. 1 and 2.

Fig. 7 is a longitudinal sectional view of one of the nozzles shown in Fig. 4 or 5 carried on its telescopic tube.

Fig. 8 is an end view of the nozzle shown in Fig. 7.

Fig. 9 is a longitudinal sectional view of one of the apertured pads shown in Fig. 5 carried on its telescopic tube.

Fig. 10 is an end view of the apertured pad shown in Fig. 9.

In the drawings like references designate the same or similar parts.

Figure 1:
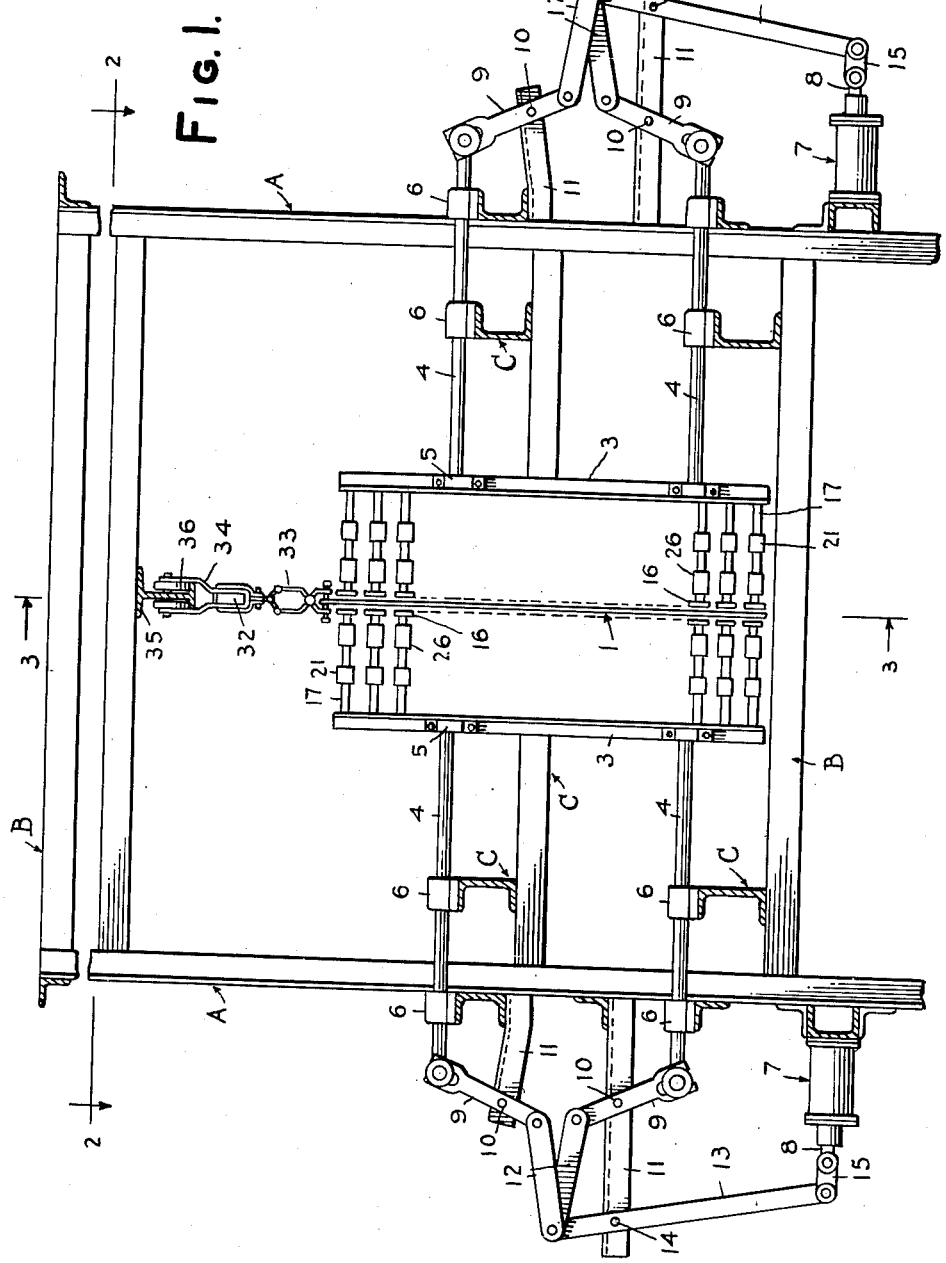
Fig. 1 shows in somewhat diagrammatic end elevation, apparatus constructed with opposed banks of shaping pads carried on telescopic members according to the present invention for producing a simple or compound bend.
Figure 2:
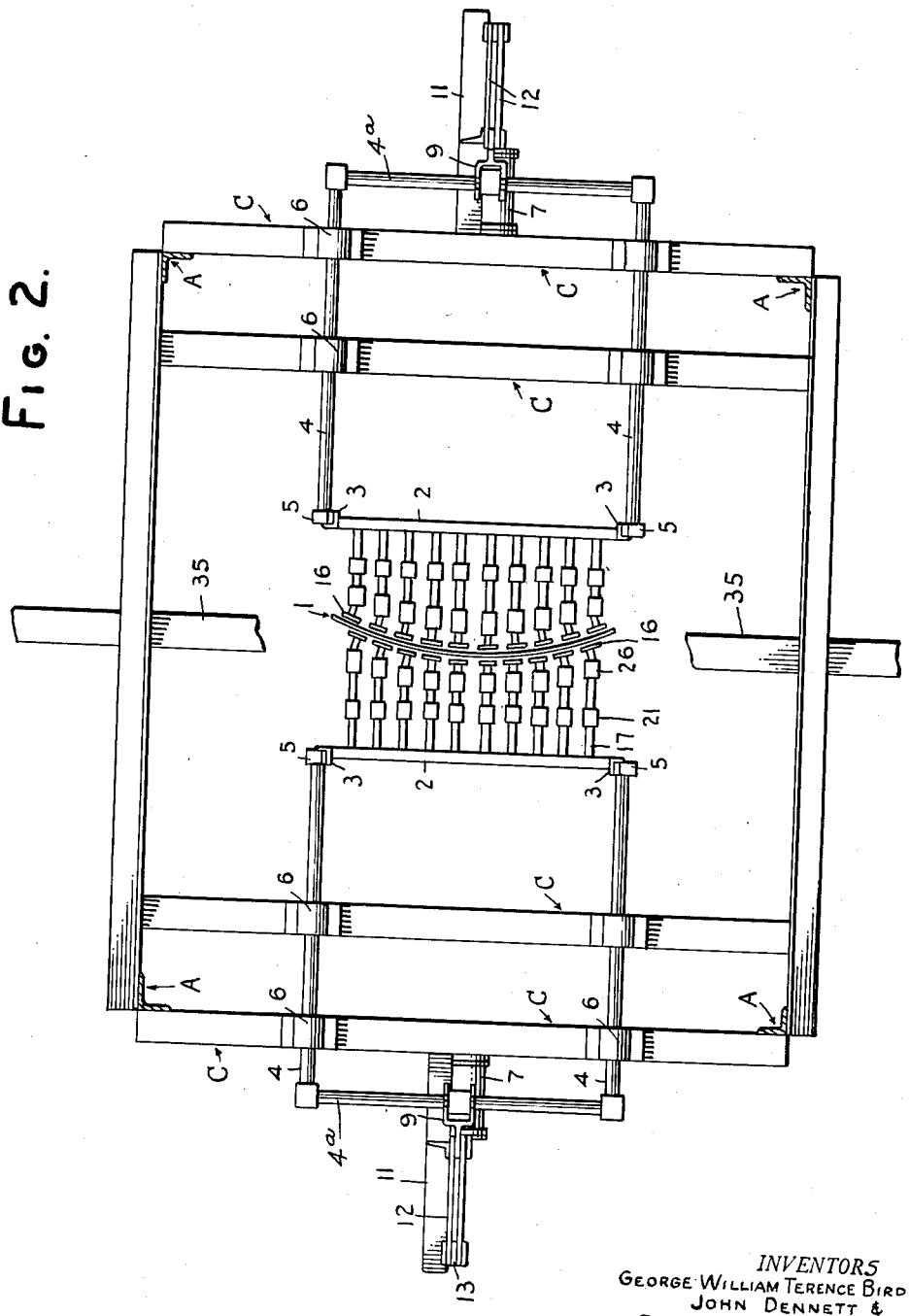
Fig. 2 is a plan view taken on the line II—II of Figure 1 showing the banks of shaping pads mounted on their respective carriers.

Within a rectangular supporting framework comprising uprights A, horizontal members B and cross bearers C, and on each side of the glass sheet 1 being shaped, is a bank of shaping pads arranged in horizontal linear groups; the construction and mounting of each shaping pad is clearly illustrated in Fig. 6 hereafter particularly referred to.

Each group of shaping pads is mounted in a horizontal bar 2 and the plurality of bars are parallelly arranged by being secured, for example, by welding to a pair of vertical bars 3 thereby a carrier for each bank of pads in the form of a rigid grid like structure is obtained.

Above and below the centre of each bar 3 is an actuating shaft 4 connected to the bar by a bracket 5, and the shafts pass through bearings 6 carried on cross bearers C of the framework. The carriers are thus supported by the cross bearers C on which the shafts are slidable and by actuating the shafts the carriers are to be advanced towards and retracted from each other.

The reciprocating movement of the shafts 4 is effected by hydraulic means of which the double acting cylinders are indicated at 7 and the piston rods at 8. The shafts 4 are coupled as shown by rods 4a and the pair of rods 4a of each grid is connected to the respective piston, by levers 9 pivoted at 10 on fixed members 11, and links 12 hingedly connected to levers 13 pivoted at 14, the lower end of each lever 13 being connected by a link 15 to the respective piston rod 8, so that on an outward movement of the pistons as viewed in Figure 1 the grids carrying the pads are retracted from the glass 1, and when the pistons are actuated inwardly the carriers are moved towards one another to impart a predetermined bend on a flat sheet of hot glass disposed between them.

Instead of actuating the shafts, the carriers may be hydraulically actuated to slide along the shafts by connecting the levers 9 to rigid links attached to the carriers.

Referring now particularly to Figure 6 each shaping pad 16 is carried on a telescopic member comprising a tube 17 and a rod 18. The tube 17 is welded to a bar 2 of the respective grid like carrier, the free end of the tube 17 being split longitudinally as indicated at 19 and chamfered exteriorly to receive a tapered packing 20 within a sleeve 21 in threaded engagement with the tube 17. By screwing the sleeve onto the tube, the packing presses on the split end of the tube, contracts the latter onto the rod and clamps the rod in set axial relation with the tube. On the outer end of the rod 18 is screwed a socket member 22 for a ball 23 into which latter is screwed the stub 24 of the shaping pad. The member 22 is provided with a ring 25 of lubricating material and the ball is held to the socket by a thimble 26 which houses a spring 27 disposed between the socket member 22 and a keeper ring 28 threaded into the thimble. The spring thereby acts to draw the thimble onto the ball to locate the latter.

By such an arrangement the shaping means is connected to the respective telescopic member by means of a construction which is in nature a ball and socket joint which enables the shaping means to be swivelled about the end of the member.

The stub 24 may be in axial alignment with its telescopic member, as shown, or may be tilted into angular relation therewith, to vary the form of the bend to be imparted to the glass.

The ready adjustability of each individual pad permits the pads to be set against a former or template so that precise setting of the shaping means as a whole can be achieved and an accurate product constantly produced.

When the pad is in set position it is positively clamped to the socket by rigidly drawing down the thimble 26. To this end, the thimble is formed with a lug 29, through which is hooked a rod 30, and the other end thereof is threaded to receive an operating member 31 which in one direction of rotation positively draws the thimble into clamping position and holds the pad in set position so that the pads can be individually secured in relative position for effecting various forms of bends whether simple or compound.

The glass sheet 1 to be bent in the apparatus described is suspended by an articulated tong bar diagrammatically shown at 32, from which depend pairs of tongs 33 which grip the top edge of the glass. The tong bar is itself suspended by arms 34 from a runway 35, the arms being provided with wheels 36 which run along the runway as will be well understood, when a tractive force (e. g., by cable, not shown) is applied to the arms 34 to bring the glass sheet at first into the furnace not shown, and after it has been heated to its softening temperature, to dispose that sheet in the apparatus described between the two banks of shaping pads.

Thereby glass can be transported to tempering means through which the runway passes so that hot glass can be bent and then tempered in quickly successive stages spaced in intervals only by the time taken to retract the shaping means and to transport the glass to the tempering station.

Figure 4:
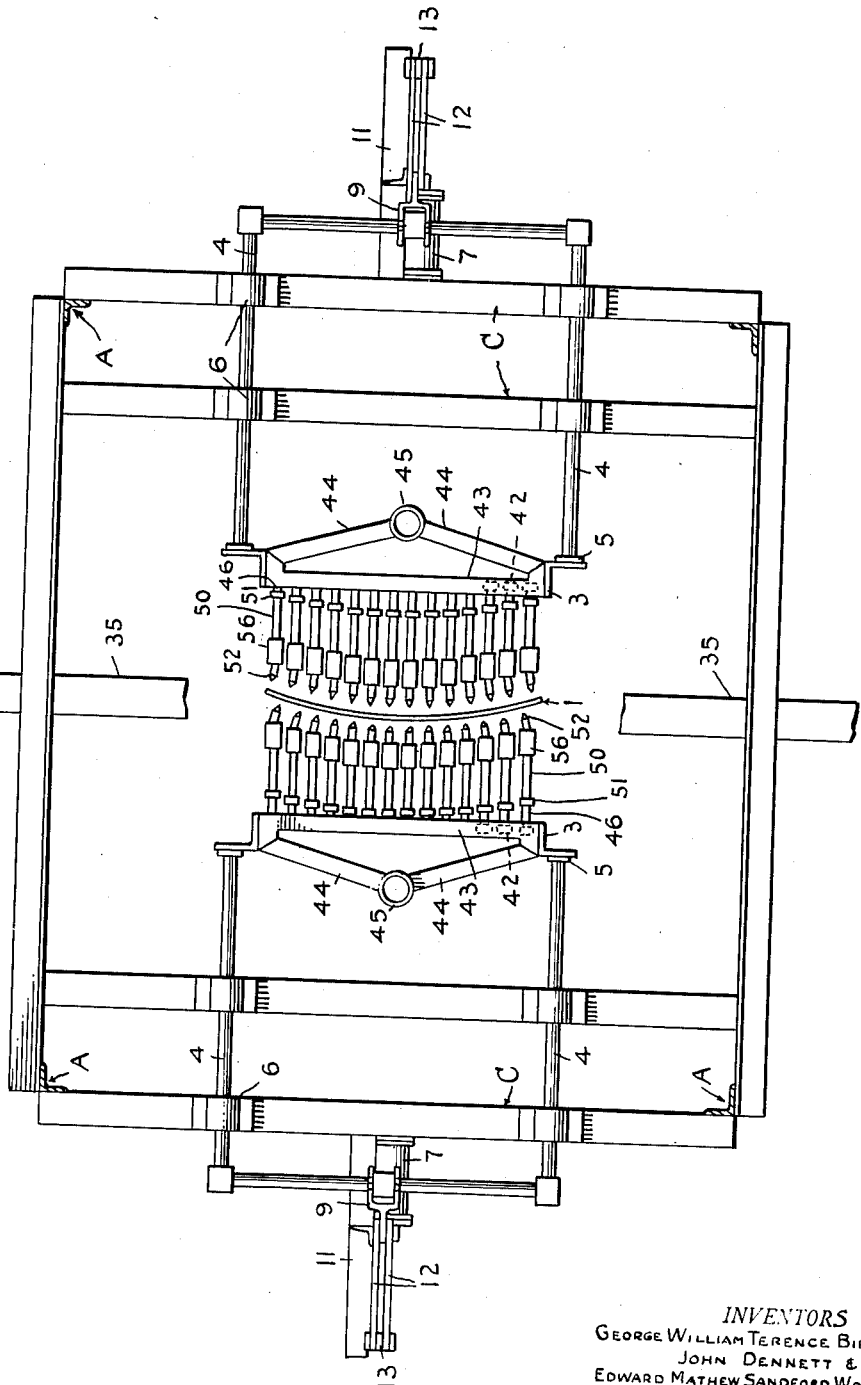
Fig. 4 is a plan view, similar to Figure 2, of an apparatus constructed with opposite banks of nozzles carried on telescopic tubes according to the present invention for tempering flat glass having a simple or compound bend.
Figure 5:
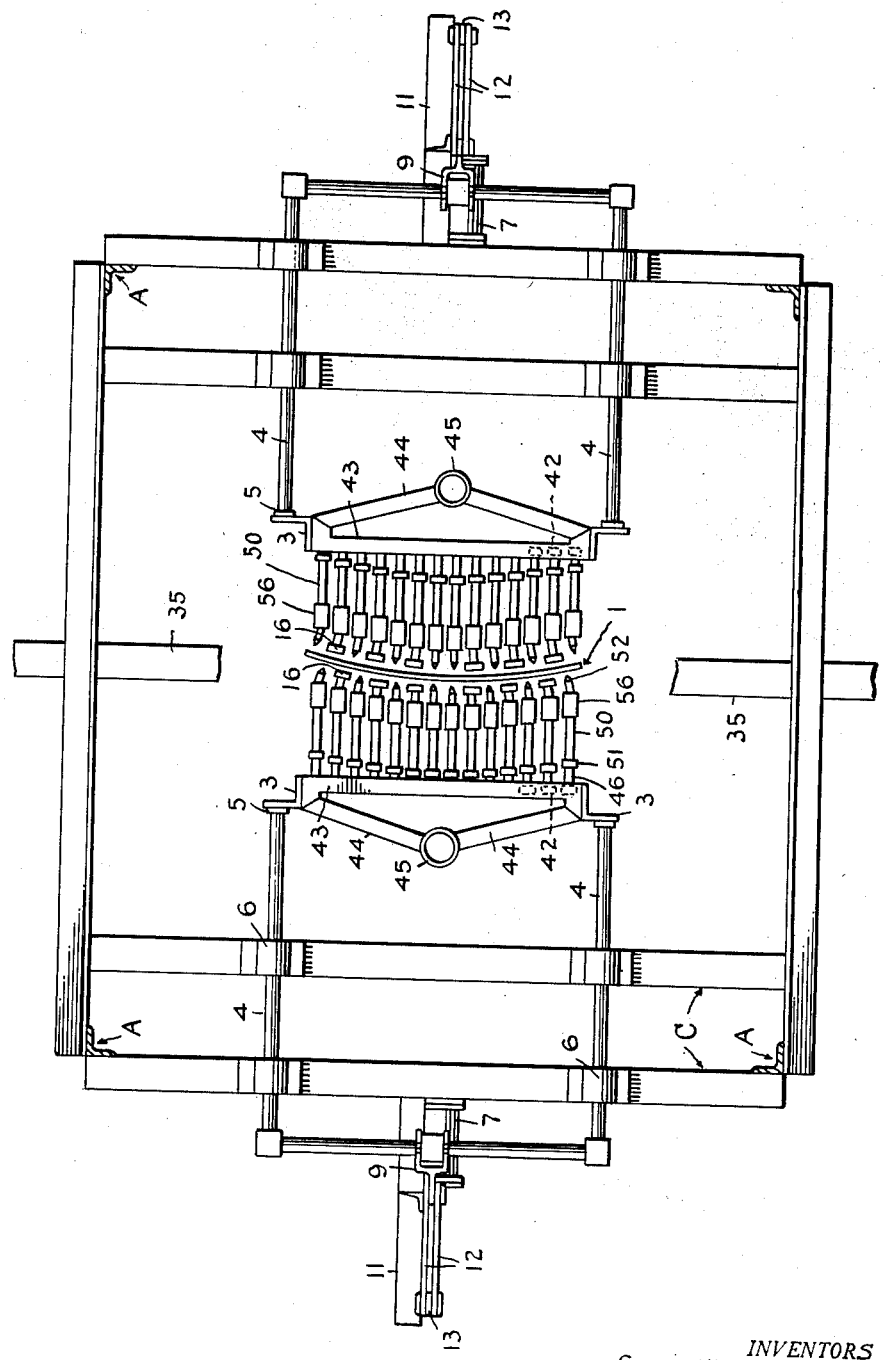
Fig. 5 is a plan view, similar to Fig. 2 or 3, of an apparatus constructed with opposite banks of nozzles and shaping pads according to the present invention for bending and tempering a flat glass sheet.

The tempering apparatus according to the present invention and shown in Figure 4 comprises opposed banks of nozzles, one to each side of the bent glass sheet 1 being tempered which are constituted by vertical linear groups of nozzles mounted on pipes 42 of rectangular cross section (Fig. 7) parallely arranged between pairs of headers 43 secured or welded to the vertical bars 3; thereby a carrier for each bank of nozzles in the form of a rigid grid like structure is obtained.

Each pair of headers 43 is connected by tubular arms 44 to a supply tube 45 connected by a flexible tubing to a source of supply (not shown) of the quenching fluid.

Figure 3:
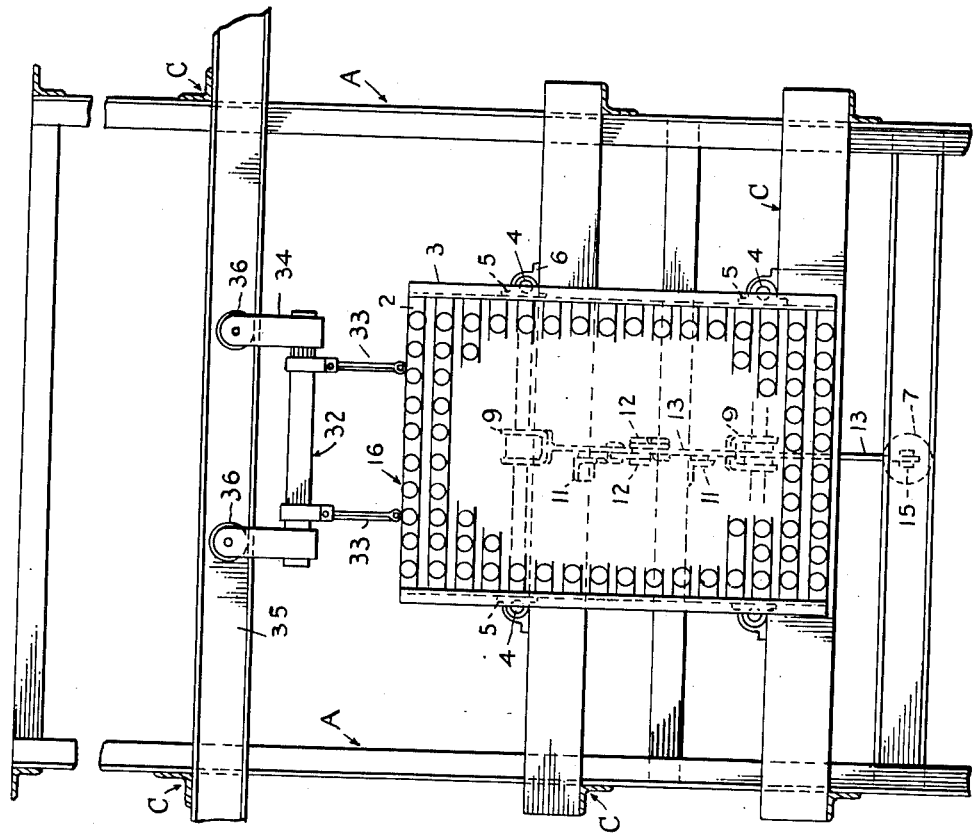
Fig. 3 is a side elevation taken on the line III—III of the apparatus shown in Figure 1.

The hot glass to be tempered is suspended between the two banks of nozzles by an articulated bar diagrammatically shown at 32 in the Figs. 1 and 3.

In accordance with the present invention the pipes 42 of the two tempering grids are each provided with a group of telescopic tubes, and each telescopic tube carries a nozzle by which quenching fluid supplied through the respective tube is directed against the locality of that face of the bent glass sheet, opposed to the nozzle.

Each pipe 42 is apertured at suitable intervals on the inner face to receive a tube 46 which is welded to the pipe 42, the free end 46-a thereof being split longitudinally, as indicated at 46-b in Fig. 7, and chamfered interiorly to receive a tapered plug 47, through which axially passes a threaded end of a rod 48, the other end of the rod passing through the outer face of the pipe 42 to receive an operating member 49 fixed to the rod. By suitably rotating the member 49 the plug is drawn into the split end of the tube 46, thereby wedging it outwardly.

On the tube 46 is slidably mounted a coaxial tube 50 provided with a sealing gland 51, and the tapered plug 47 is apertured, as shown as 47-a in Figure 7, to allow the quenching fluid supplied to the pipe 42 to pass from the tube 47 into the tube 50. The tubes 47 and 50, therefore, constitute a telescopic tube, and the tapered plug operating within the split end of the tube 47 effects a clamping of the latter against the tube 50 to hold the two in each position of relative axial adjustment. An abutment 48-a is fixed to the rod 48 to engage the inner face of the pipe 42 and thereby withdraw the plug from the tube when the operating member 49 is reversely rotated.

The tube 50 carries a nozzle 52, so that by the relative axial adjustment aforesaid the length of the path of the quenching jet from the nozzle to the locality of the glass on which the jet impinges may be precisely regulated.

In the construction shown in Fig. 7 each nozzle 52 emanates from a ball 53 set in a socket 54 provided with a sealing ring 55 and mounted on the end of the tube 50, the ball being located on its socket by a thimble 56, which houses a spring 57 disposed between the socket 54 and a keeper ring 58 threaded into the thimble 56. The spring 57 thereby acts to draw the thimble on to the ball to locate the ball.

The nozzle may be in axial alignment with its telescopic tube, as shown, or may be tilted into angular relation therewith to vary the direction of the quenching jet. When the nozzle is in set position it is positively clamped to the socket by rigidly drawing down the thimble 56. To this end the thimble is formed with a lug 56-a, through which is hooked a rod 59, and the other end thereof is threaded to receive an operating member 60 which, acting through a spacing element 61 against a lug 42-a carried by the tube 42, in one direction of rotation positively draws the thimble into clamping position and holds the nozzle in set position, whereby the direction of the quenching jet may be varied and the chosen direction secured.

To assist in setting the nozzles with respect to the glass disposed between them each nozzle is provided with a feeler constituted by a ring 63 threaded on to the barrel of the nozzle to be adjustable thereon, the ring carrying three similar and equidistant legs 64. Accordingly, a template having the form of glass to be tempered is placed in the position of the glass during tempering and the telescopic tube adjusted, and by the spider-like feeler engaging the glass the nozzle is set in desired relation with the glass.

Various modifications may be made in carrying out the present invention; for example, a roller may be substituted for the ball 53 to provide a hinge joint for a nozzle, or the swivelling of the nozzles may be effected by means other than that herein described, and the axial adjustment of the nozzles may be effected otherwise than by using the mechanism herein mentioned, as will be readily understood by those skilled in the art.

Before disposing the bent glass sheet 1 between the two opposite banks of nozzles these banks are retracted from each other for giving a free passage to the bent sheet, the hydraulic system is actuated for setting the nozzles in desired relation to the glass to be tempered and when the tempering has been made, for retracting the opposite banks of nozzles from each other to their initial location.

Various modifications may be made in carrying out the present invention; for example it may be suitable to give the banks of nozzles an oscillating or circuitous movement in a plane perpendicular to the mean plane of the direction of the quenching jets. That movement is obtained by well known means which are not hereby illustrated and explained.

Instead of successively bending and tempering a flat glass sheet by means of two different apparatus, it is sometimes desirable to have these operations produced by the same apparatus which is provided with bending and tempering means as illustrated by Figures 5, 7, 8, 9 and 10. It is the case of thin glass sheets in which too great heat losses would occur if they were treated in two different apparatus.

The apparatus for bending and tempering a flat glass sheet is similar to the above described tempering apparatus, but it differs therefrom in that each bank disposed on each side of the glass sheet 1 comprises nozzles and shaping pads arranged in vertical linear groups, in each of which nozzles and shaping pads alternate as clearly shown in Figures 5, 7, 8, 9 and 10 hereafter particularly referred to.

Each group of nozzles and pads is mounted on a pipe 42 of rectangular section and each shaping pad is preferably apertured as indicated at 65 (Fig. 9) to form jet blowing means. Each nozzle 52 is mounted exactly as a nozzle of the above described tempering apparatus and each shaping pad is similarly mounted to the nozzles 52 being carried on a barrel 66 emanating from a hollow ball 53 supported in a socket 54 and held thereto by a thimble 56, and after setting the pad it too can be clamped by drawing its thimble 56 down on to it as already explained for the nozzle 52.

The precise adjusting of each nozzle and shaping pad in predetermined relation to effect a particular bend and the proper tempering of the glass sheet after its bending is made by individually setting each nozzle and pad against a former or template and clamping each of them in set position as above described for each distinct shaping and tempering apparatus.

The pads and nozzles, having been set in predetermined relation to effect a particular bend and clamped in set position by drawing down the respective thimbles 56, the hot glass is disposed centrally of the opposed grid frames, the hydraulic system actuated to apply the shaping pads simultaneously to both faces of the glass to produce required shape and then retracted from the glass and immediately thereafter the bent glass is tempered by quenching jets projected from the nozzles and pads.

Various modifications may be made in carrying out the present invention; for example, a roller may be substituted for the ball 53 to provide a hinge joint for a nozzle, or shaping pad, or the swivelling of the nozzles or pads may be effected by means other than that herein described and the axial adjustment of the nozzles or pads may be effected otherwise than by using the mechanism herein mentioned as will be readily understood by those skilled in the art.

In a further modified form all the telescopic tubes may be provided with apertured shaping pads.

Moreover, instead of grid structures including pipes 42, two air boxes may be employed, the opposed faces being complimentally curved, and suitably apertured, a telescopic tube as herein described being mounted over each aperture.

In some cases, the tempering operation is to be performed whilst giving an oscillating or circuitous movement to the banks of nozzles and pads. For this purpose, the banks are fitted in a known manner (not shown) with means which impart to them the required movement in a plane perpendicular to the mean direction of the quenching jets.

What is claimed is:

1. Apparatus for bending a sheet of glass, which has been heated to near its softening point, including two similar carriers arranged in spaced relation, a plurality of adjustable telescopic arms supported on each of said carriers, means for locking said arms when adjusted axially to and from its carrier, a shaping pad individual to each arm and adjustably mounted on the outer end of said arm, means for maintaining the pad in its adjusted position and means for moving the carriers toward and away from each other to effect the bending operation.

2. Apparatus for tempering a bent glass sheet which has been heated to approximately its softening point, including opposed banks of nozzles adapted to simultaneously direct quenching jets against both faces of the glass when disposed between them, a hollow member adjustable in length individual to each nozzle, means for fixing the length of said member when adjusted and feelers adjacent each nozzle for spacing the same a predetermined distance from the surface of the glass to be tempered whereby the nozzle may be set to provide a jet of cooling fluid of predetermined length.

3. Apparatus for bending and tempering a glass sheet which has been heated up to near its softening temperature, including a pair of carriers arranged in opposed relation, a plurality of individual shaping means and tempering nozzles supported by said carriers, an extensible member individual to each shaping means and tempering nozzle and connected to its respective carrier, an adjustable connection between said member and said shaping means and tempering nozzle whereby the same may be adjusted to a selected position, and means for moving the carriers whereby the shaping means and tempering nozzles supported by the respective carriers are moved toward and away from each other.

4. Apparatus for bending and tempering a glass sheet which has been heated up to near its softening temperature, including a pair of carriers arranged in opposed relation, a plurality of individual shaping means and tempering nozzles supported by said carriers, an extensible member individual to each shaping means and tempering nozzle and connected to its respective carrier, an adjustable connection between said member and said shaping means and tempering nozzle whereby the same may be adjusted to a selected position, means for moving the carriers whereby the shaping means and tempering nozzles supported by the respective carriers are moved toward and away from each other and means for moving the glass sheet to the bending and tempering stations.

5. Apparatus for bending and tempering a glass sheet which has been heated to approximately its softening temperature, including a pair of similar carriers arranged in spaced relation, a plurality of telescopic arms connected to each carrier, shaping means and tempering nozzles adjustably mounted on the outer ends of said arms and means for moving the carriers toward and away from each other successively to the desired position for the bending and tempering of the glass sheet.

6. Apparatus for bending and tempering a sheet of glass heated approximately to its softening point including a pair of opposed carriers, a plurality of individual adjustable shaping pads supported by each carrier, a nozzle for chilling fluid arranged internally of each of said pads, means for moving the carriers relatively to bring the shaping pads in contact with the glass sheet to shape the same and thereafter move the carriers away from the glass sheet to withdraw the shaping pads from contact therewith and to bring said nozzles into a predetermined position spaced from the glass sheet for the application of the chilling fluid and means for individually and independently locking said pads in their adjusted positions.

7. Apparatus for bending and tempering a sheet of glass which has been heated to approximately its softening point including a pair of opposed carriers, shaping means supported by each carrier for imparting a predetermined bend to the sheet of glass, a plurality of nozzles supported by each carrier, means for moving the carriers to bring the shaping means into contact with the glass sheet to shape the same and thereafter move the carriers away from the glass sheet to withdraw the shaping means from contact therewith and to bring the nozzles into a predetermined position spaced from the glass sheet for the application of the chilling fluid, and means for varying the position of the exit end of each nozzle with respect to the glass sheet.

8. Apparatus for bending and tempering a sheet of glass which has been heated approximately to its softening point including a pair of opposed carriers, a plurality of telescopic tubes mounted on each carrier, a shaping pad mounted on the outer end of each of said tubes, a conduit in said tubes and pads, means for supplying cooling fluid to said conduits, means to move the carriers toward and away from the glass sheet and thereby move the respective pads in an axial direction.

9. In apparatus for bending and tempering a sheet of glass which has been heated to approximately its softening point the combination of a pair of opposed carriers each constituted of a header and a plurality of conduits connected thereto, a plurality of nozzles in communication with said conduits and supported thereby, a movable connection between each of said nozzles and its supporting conduit whereby said nozzle may be adjusted to a selected position, shaping means supported by each carrier and means for moving the carriers to bring the shaping means into contact with the glass sheet to shape the same and thereafter move the carriers away from the glass sheet to withdraw the shaping means from contact therewith and to bring the nozzles into a predetermined position spaced from the glass sheet for the application of the chilling fluid.

10. In an apparatus for bending a glass sheet which has been heated up to near its softening temperature, the combination of two similar carriers arranged on each side of the sheet in spaced relation, adjustable supporting means mounted on the said carriers, shaping pads individual to and carried by said supporting means, means for locking the supporting means in its adjusted position, adjustable means mounted on each supporting means and connected to each pad for varying the inclination of said pad relative to its supporting means, means for maintaining said adjustment and means for mutually moving the carriers towards each other to effect the bending of the glass sheet and for separating the carriers from each other after the bending operation.

11. In an apparatus for bending a glass sheet which has been heated up to near its softening temperature, the combination of two similar carriers arranged on each side of the sheet in spaced relation, adjustable supporting means mounted on the said carriers, shaping pads individual to and carried by said supporting means, means for locking the supporting means in its adjusted position, a universal joint mounted on each supporting means and connected to each pad for varying the inclination of said pad relative to its supporting means, means for maintaining said adjustment and means for mutually moving the carriers towards each other to effect the bending of the glass sheet and for separating the carriers from each other after the bending operation.

12. Apparatus for bending and tempering a sheet of glass which has been heated to approximately its softening temperature including a pair of opposed carriers, a plurality of individual adjustable nozzles supported by each carrier, a plurality of individual adjustable shaping means supported by each carrier and alternately disposed in respect to said nozzle, means for moving the carriers to bring the shaping means into contact with the glass sheet to shape the same and thereafter move the carriers away from the glass sheet to withdraw the shaping means from contact therewith and to bring the tempering means into a predetermined position spaced from the glass sheet for the application of the chilling fluid and means for individually and independently locking said shaping means and nozzles in their adjusted positions.

References Cited in the file of this patent

UNITED STATES PATENTS

| Number | Name | Date |
|---|---|---|
| 201,689 | Leermo | Mar. 26, 1878 |
| 1,111,958 | Goffin et al. | Sept. 29, 1914 |
| 1,769,944 | Crisp | July 8, 1930 |
| 2,111,370 | Owen | Mar. 15, 1938 |
| 2,213,405 | Paddock | Sept. 3, 1940 |
| 2,216,533 | Kaplan | Oct. 1, 1940 |
| 2,250,628 | Forbes | July 29, 1941 |
| 2,251,159 | Owen | July 29, 1941 |
| 2,372,418 | Forbes et al. | Mar. 27, 1945 |
| 2,411,701 | Weihs | Nov. 26, 1946 |

FOREIGN PATENTS

| Number | Country | Date |
|---|---|---|
| 639,218 | Germany | Dec. 1, 1936 |
| 845,786 | France | May 22, 1939 |